United States Patent Office 2,958,695
Patented Nov. 1, 1960

2,958,695

SYNTHESIS OF SUBSTITUTED SUCCINYL COMPOUNDS

Bernard F. Crowe, Ansonia, Conn., and Robert Y. Heisler, Fishkill, N.Y., assignors to Texaco Inc., a corporation of Delaware No Drawing. Filed Oct. 20, 1954, Ser. No. 463,594

12 Claims. (Cl. 260—294)

This invention relates to synthesis of substituted succinyl compounds and more particularly to a process for preparation of such compounds by carbonylation of certain unsaturated organic acids.

Heretofore, it has been proposed to prepare organic amides by condensation of carbon monoxide and ammonia (or a substituted ammonia) with an unsaturated carbon compound, i.e. carbonylating. The condensation is represented by the following equation:

1.
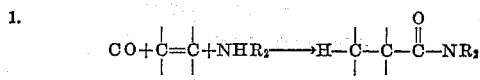

where R represents hydrogen or an organic radical.

We have now discovered, surprisingly, that unsaturated carboxylic acids containing at least five carbon atoms and having a carbon-to-carbon double bond separated from the carboxyl group by at least a pair of methylene groups are convertible by carbonylation into derivatives of substituted succinic acids (which acids have a carboxyl group on each of a pair of adjacent carbon atoms).

Our process comprises catalytically carbonylating a compound of the formula $$LCH:CH(CH_2)_nCOOH$$

where L is hydrogen or a monovalent organic radical and $n$ is an integer of at least 2, with carbon monoxide and an amine having at least one hydrogen atom attached to amino nitrogen.

Our process has numerous advantages in comparison to prior art preparations of the subject materials. One advantage of our process is that abundant and relatively inexpensive reactants can be used. Other advantages of our process include its versatility for preparation of a wide variety of products, and its adaptability for operation in a continuous manner.

The carboxylic acids useful in our process can be represented generically by the formula $$LCH:CH(CH_2)_nCOOH$$

where $n$ is an integer of at least two and L stands for the hydrogen atoms, or a hydrocarbyl radical, i.e. an organic radical composed solely of carbon and hydrogen, or a hydrocarbyl radical containing in place of some hydrogen therein one or more substituent groups which modify the carboxylic acid only to the extent that the negative logarithm of the acid dissociation constant, $pK_a$ at 25° C., remains in the range from about 3 to about 9. Thus, the groups such as alkoxy, halogen, mercapto, carbonitrile, amido, keto, carboxyaldehyde, nitro, thioester and hydroxy are included among the conceivable substituents for hydrogen in the radical L.

In the above representation the radical L can be: aliphatic, e.g. a straight or branched chain or cyclic radical having empirical formula $C_mH_{2m+1}$ (i.e. alkyl), or $C_mH_{2m-1}$ (i.e. alkenyl and cycloalkyl), or $C_mH_{2m-3}$ (i.e. alkynyl and cycloalkenyl), or alkapolyenyl such as alkadienyl or alkatrienyl; also aromatic, e.g. phenyl, biphenylyl, or naphthyl; also araliphatic, e.g. benzyl, tolyl or styryl; or one of the above hydrocarbyl radical types wherein one or more hydrogen atoms is replaced by a substituent group such as those described hereinbefore.

For efficiency and economy in the practice of our invention carboxylic acids of the following structure are preferred: the radical represented by the letter L in the above formula is hydrogen or alkyl of 1–15 carbon atoms and the number of methylene groups represented by the subscript $n$ is from 2–12. Use of the preferred carboxylic acids reduces the likelihood of substantial polymerization in the reaction mixture or multiple carbonylation as would be apt to occur when the radical represented by the letter L in the above formula is alkenyl or alkynyl.

A representative but not exhaustive compilation of preferred carboxylic acids suitable for use in our process is: oleic, $C_8H_{17}CH:CH(CH_2)_7COOH$; 9, 10 undecylenic, $CH_2:CH(CH_2)_8COOH$; 8, 9 undecylenic, $CH_3CH:CH(CH_2)_7COOH$; brassidic, $$C_8H_{17}CH:CHC_{11}H_{22}COOH$$

4-pentenoic, $CH_2:CH(CH_2)_2COOH$; myristolenic, $$CH_3C_4H_9CH:CH(CH_2)_7COOH$$

palmitoleic, $C_6H_{13}CH:CH(CH_2)_7COOH$; 5-hexenoic, $CH_2:CH(CH_2)_3COOH$; 6-heptenoic, $$CH_2:CH(CH_2)_4COOH$$

7-octenoic, $CH_2:CH(CH_2)_5COOH$; 8-nonenoic, $$CH_2:CH(CH_2)_6COOH$$

9-decylenic, $CH_2:CH(CH_2)_7COOH$; 9-dodecylenic, $$CH_3CH_2CH:CH(CH_2)_7COOH$$

petroselinic, $CH_3(CH_2)_{10}CH:CH(CH_2)_4COOH$; vaccenic $CH_3(CH_2)_5CH:CH(CH_2)_9COOH$; gladoleic, $$CH_3(CH_2)_9CH:CH(CH_2)_7COOH$$

and cetoleic $CH_3(CH_2)_9CH:CH(CH_2)_9COOH$.

The amines useful in our process are basically reacting and can be either primary or secondary, including monoamines, diamines and polyamines whether saturated or unsaturated; from our experimental work it appears that the invention process is specific to these useful amines and that ammonia does not produce a similar reaction. The formula of suitable primary amines for the practice of our invention can be represented as $RNH_2$ where R is a monovalent organic radical. The formula of suitable secondary amines for the practice of our invention can be represented by the formula $RR'NH$, where R and $R'$ are linked to form a single divalent radical, e.g. as in the compound piperidine (pentamethyleneimine), or they are the same or different distinct monovalent organic radicals. The organic radicals R and $R'$ in the above amine formulae can be hydrocarbyl or substituted hydrocarbyl having in place of some hydrogen therein one or more substituent proups which modify the amine only to the extent that the negative logarithm of the basic dissociation constant, $pK_b$, remains in the range from about 3 to about 10. Thus, the groups such as alkoxy, halogen, mercapto, carbonitrile, amido, keto, carboxyaldehyde, nitro, thioester and hydroxy are included among the conceivable substituents for hydrogen in the radicals R and $R'$.

Suitable organic radicals represented by the symbols R and $R'$ in the above amine formulae can be: aliphatic, e.g. straight or branch chain alkyl, alkenyl, alkapolyenyl or alkynyl, preferably saturated $C_5$ to $C_{12}$ radicals; aryl, e.g. phenyl, biphenylyl and naphthyl; araliphatic e.g. benzyl, tolyl and styryl; alicyclic, e.g. cyclohexyl, cyclopentadienyl, cycloheptyl and cyclohexenyl; heterocyclic, e.g. furyl, furfuryl and pyranyl; or a radical of any of the above types containing in place of hydrogen one or more substituent groups such as those listed hereinbefore in this connection. Representative types of amine reactants especially suitable for our process are: aniline, p-toluidine, piperidine and n-hexylamine.

Primary amines used according to the process of our invention yield substituted succinimides with elimination of water. This, when the carboxylic acid used is undecylenic and the amine used is p-toluidine, there is obtained N-paratolyl octyl succinimide,

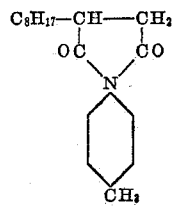

Using secondary amines the product is an amide of a substituted succinic acid. Thus, when the carboxylic acid is oleic and the amine used is piperidine, there is formed pentamethylene diamide of pentadecyl succinic acid,

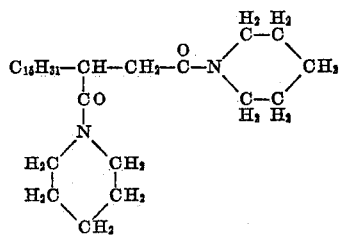

The substituted succinic acid corresponding to the above-described amine and amide products can be made, for example by alkaline hydrolysis of the nitrogen-containing reaction product followed by acidification, or, alternatively, by acid hydrolysis of the nitrogen-containing reaction product. The substituted succinic acid can be converted into a variety of corresponding materials using conventional techniques, e.g. into an anhydride by treating with acetic anhydride, or into an ester by treating with an alcohol in the presence of a suitable catalyst. For efficiency and economy in the practice of our process it is preferred to hydrolyze the reaction product and recover the substituted succinic acids by crystallization from solvents. After hydrolysis a substantial amount of the amine used can be recovered. This adds markedly to the economy of the process. Alternatively, the unhydrolyzed product can be separated by solvent extraction and crystallization. The substituted succinic acids obtainable by our process are useful for corrosion inhibition in hydrocarbon oils.

The following equations, using for example oleic acid and aniline reactants, are intended to be a guide for understanding the nature of our novel reaction, but are not to be construed in limitation thereof.

2.

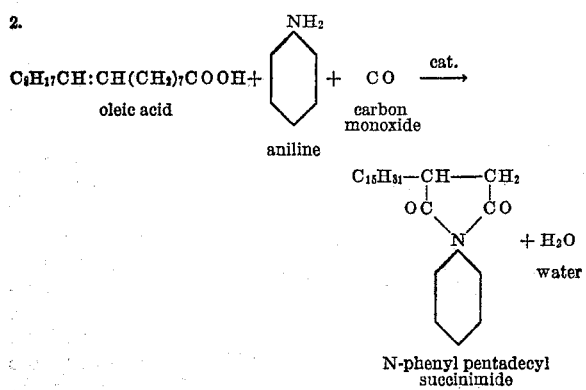

3.

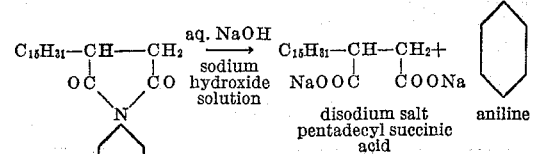

4.

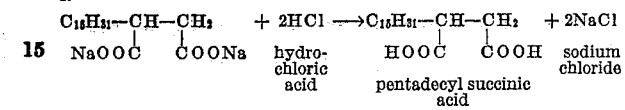

5.

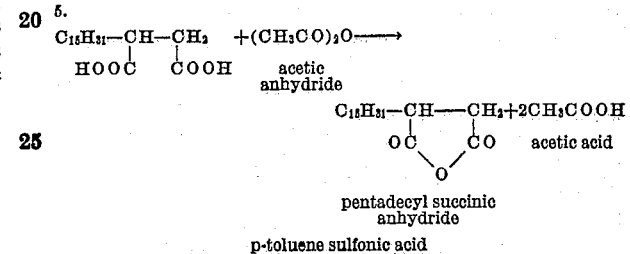

p-toluene sulfonic acid

6.

Various conventional carbonylation catalysts are suitable in our process, e.g. those containing metals of the iron subgroup of the Periodic Table (Fe, Ni and Co). Catalyst containing cobalt is preferred for effectiveness. While in some cases it suffices to add to the reaction mixture a cobalt compound convertible to dicobalt octacarbonyl and/or cobalt hydrocarbonyl under conditions of the carbonylation, e.g. cobalt carbonate, we particularly prefer to use the cobalt carbonyl itself in concentration of about 0.1 to about 5 weight percent based upon the weight of the reaction mixture.

To dissolve components of the reaction mixture and to make the mixture easier to handle it is of advantage to employ a relatively low-boiling diluent, e.g. a hydrocarbon such as pentane or toluene. Amount of diluent used is suitably from about 500 to about 1000 ml. per mol of the carboxylic acid charged, and preferably about 800 ml. per mol.

Elevated pressures are advantageous in the reaction, e.g. above 1000 p.s.i.g. Preferably the pressure employed is from about 3000 to about 9000 p.s.i.g., and especially preferred is pressure from 3000–5000 p.s.i.g. Temperature should be at least 250° F. to obtain substantial reaction rate. Preferred temperatures are between 300° and 500° F. and especially about 400° F. Use of temperature substantially above 600° F. is likely to cause secondary reactions to an undesirable extent.

The carbon monoxide used in the carbonylation reaction is preferably of high purity, but it also can be diluted with inert gases such as nitrogen or argon if desired. Proportions of carboxylic acid and amine used for the carbonylation reaction are preferably about stoichiometric for the particular succinimide or succinamide desired, but this ratio can be varied to some extent without substantially affecting the process.

Batch carbonylation appears to be the most economical and versatile carbonylation technique for manufacture of small quantities of these succinyl compounds; but, where demand warrants it, continuous or semicontinuous techniques on the order of those proposed for aldehyde production from olefins, carbon monoxide and hydrogen can be adapted for use in our process.

Suitable materials of construction for the carbonylation reactor are glass-lined steel, silver-lined steel, or a high alloy stainless steel such as American Iron and Steel Institute Standard Type No. 410.

The following examples show ways in which our invention has been practiced employing a number of representative amines and carboxylic acids. These examples are not to be construed as limiting the invention. Except as otherwise noted all percentages given are weight percentages.

*Example 1.* — A mixture containing C.P. oleic acid, C.P. aniline and cobalt carbonyl catalyst was subjected to 3000 p.s.i.g. carbon monoxide pressure in an agitated stainless steel reactor. Temperature was raised to and maintained at about 400° F. until carbon monoxide absorption was no longer apparent, as evinced by pressure in the reactor subsiding to a constant value. The reactor was then cooled to room temperature and vented of gas. Remaining reactor contents were solid at room temperature. The bulk of the solid material was scraped out. Solid material adhering to the reactor wall was removed by heating to 140° F. with an organic solvent. The solvent was then stripped off and the residue combined with the rest of the solid product. The combined solid product was heated with an organic solvent and the mixture filtered. No solids, insoluble in the hot solvent, were evident on the filter.

A dark oil settled from the hot organic solution upon standing. The solvent was decanted from said oil and chilled, resulting in the precipitation of a yellow-white solid. Purification of this solid was obtained by repeated crystallization from solvent to yield white crystal N-phenyl pentadecyl succinimide. Table I below summarizes pertinent data from four such runs.

| Weight Percent | Acid Product | C-19 Dibasic Acid (Calculated) |
|---|---|---|
| C | 69.60 | 69.51 |
| H | 11.10 | 10.97 |
| O | 19.64 | 19.57 |
| N | Negative Qualitative test. | 0 |
| Neutralization Equivalent | 169 | 164 |

A portion of the crude reaction product from run No. 4, above, was subjected to the following treatment: recrystallized from n-heptane, then from isopropanol to yield a white crystalline solid melting at 71–72° C. and having neut. number of 1.8; this solid subjected to hydrolysis conditions in five portions with aqueous 10% potassium hydroxide using average temperature of 660° F., average nitrogen pressure of 2850 p.s.i.g. and average reaction time of 4 hours; hydrolysis products were combined and acidified with dilute sulfuric acid to yield a second solid; the second solid separated by filtration, washed with water, and recrystallized from acetone three times to yield a white powder melting at 105–107° C. and having neut. number of 322. Calculated neut. number of $C_{19}$ dibasic acid is 342, indicating that the recovered material obtained to comprise 93% dibasic acid.

The anhydride of the above-prepared acidic white powder was made by the following procedure: mixed 60 grams of said white powder with 200 ml. benzene, 1 ml. concentrated sulfuric acid, and 50 grams isopropanol; distilled mixture until distillate temperature reached 80° C.; cooled residue and neutralized sulfuric acid therein with calcium carbonate and water; stripped off benzene and isopropanol by distillation at atmospheric pressure; distilled stripped residue under reduced pressure to yield a white solid (B.P. 195–201° C. at pressure below 1 mm. Hg); and crystallized the distilled solid twice from acetone to obtain a solid product melting at 70.5–72° C. Carbon and hydrogen analysis of this solid product was as follows: C=73.7%, H=11.1%; analysis

*Table I*

| Run # | 1 | 2 | 3 | 4 |
|---|---|---|---|---|
| Reactor size, ml | 1,535 | 1,535 | 1,535 | 7,590. |
| Charge, grams: | | | | |
| Oleic Acid | 423 | 423 | 423 | 2,441. |
| Aniline | 140 | 140 | 140 | 805. |
| Cobalt carbonyl | 3 | 3 | 3 | 10. |
| Max. temp., °F | 406 | 404 | 410 | 405. |
| Max. press., p.s.i.g | 5,480 | 5,400 | 5,530 | 5,300. |
| Press. Drop, p.s.i | 520 | 480 | 620 | 900. |
| Reaction time, hrs | 4 | 4 | 4 | 12½. |
| Reactor cleaning solvent | isopropanol | isopropanol | isopropanol | acetone. |
| Crystallizing solvent | heptane | acetone | acetone | petroleum ether. |
| Pentadecyl succinimide isolated: | | | | |
| Grams | 136 | 200 | 255 | 2,030 (crude). |
| M.P., °C | 72–73 | 72–73 | 72–73 | |
| Analysis, wt. percent— | | | | |
| C | 77.60 | 77.90 | 78.20 | |
| H | 10.20 | 10.30 | 10.30 | |
| O | 8.18 | 8.36 | 8.50 | |
| N | 3.69 | 3.77 | 3.73 | |
| Br. addition No | 1 | 4 | | |
| Molecular Weight | 384 | 372 | 384 | |
| Carbonyl No | | | 0.3 | |
| Neut. No | | | insignificant | |

Calculated analysis for N-phenyl pentadecyl succinimide, wt. percent: C=78.18; H=10.13; O=8.31; N=3.63; M.W.=385.

Product of run No. 2, above, was hydrolized with 10% aqueous potassium hydroxide solution at 660° F. under pressure of 2600 p.s.i.g. An acidic material having M.P. of 104.5–105° C. was recovered from the hydrolized mixture after acidification. Analysis of the acid product was as follows:

calculated for anhydride of pentadecyl succinic acid ($C_{19}H_{34}O_3$) is C=73.5%, H=11%.

The infrared spectrum of a sample of the so-prepared $C_{19}$ anhydride was compared with those of purified samples of succinic anhydride, glutaric anhydride, acetic anhydride, and the anhydride of octadecylsuccinic acid. The spectra obtained from the samples of the $C_{19}$ anhydride prepared according to the invention process, the octadecylsuccinic anhydride and the succinic anhydride all showed strong absorption peaks for the carbonyl grouping at 5.37 and 5.62 microns, with the peak at 5.62 showing stronger absorption, whereas the spectra for the glutaric and acetic anhydrides were different, the glutaric anhydride showing absorption peaks at 5.53 and 5.67 microns, with the stronger absorption at the higher wave length. The acetic anhydride, in common with other linear anhydrides, showed absorption peaks at 5.38 and 5.70 microns, with the stronger absorption at the lower wave length. These data indicate that the $C_{19}$ anhydride, so prepared from the nitrogen-containing carbonylation product having chemical analysis corresponding to pentadecyl succinimide, was a substituted succinic acid anhydride.

Example 2.—Detailed data of six carbonylation runs is given in Table II, below. The acid and amine reactants used in each run were as follows: runs 5 and 6—oleic acid and p-toluidine; run 7—undecylenic acid and p-toluidine; runs 8 and 9—oleic acid and n-hexylamine; run 10—oleic acid and piperidine. Carbonylation procedure was similar to that of Example 1 except that toluene was used in the carbonylation reaction mixture to increase fluidity thereof.

Table II

| Run Number | 5 | 6 | 7 | 8 | 9 | 10 |
|---|---|---|---|---|---|---|
| Charge Materials: | | | | | | |
| Acid, grams | 141 | 141 | 92 | 141 | 141 | 141 |
| Amine, grams | 54 | 54 | 54 | 50 | 50 | 42 |
| Toluene, gms | 133 | 135 | 88 | 137 | 138 | 139 |
| Catalyst, gms | 4.2 | 4.2 | 2.8 | 4.2 | 4.2 | 4.2 |
| Conditions, Temp., °F.: | | | | | | |
| min | 400 | 402 | 400 | 402 | 393 | 400 |
| max | 408 | 406 | 406 | 409 | 409 | 412 |
| ave | 404 | 403 | 402 | 406 | 403 | 408 |
| CO pressure, p.s.i.g.: | | | | | | |
| min | 5,280 | 5,220 | 5,120 | 5,170 | 5,320 | 5,250 |
| max | 5,500 | 5,460 | 5,270 | 5,320 | 5,460 | 5,420 |
| Press. drop, p.s.i | 220 | 220 | 360 | 310 | 200 | 180 |
| Duration, hrs | 4.5 | 5 | 6.5 | 6 | 5 | 6 |

Carbonylation reaction products of runs 6, 7, 9 and 10 were subjected to hydrolysis conditions in the reactor with 10% potassium hydroxide in water and then acidified with aqueous 10% sulfuric acid. Organic acid product was recovered by extracting the acidified mixture with ether, separating the ether extract solutions from the aqueous layer, washing them with water, drying them with sodium sulfate, stripping the solvent therefrom by distillation, further treating the residue containing the product aids as shown below. Amine was recovered from the separated aqueous layer by making this layer alkaline with aqueous 10% sodium hydroxide, extracting the alkaline layer with ether, washing the ether extract solution with water, drying it with sodium sulfate, stripping off solvent by distillation, and distilling amine from the stripped residue under reduced pressure.

The recovered acid product was refluxed with an excess of acetic anhydride for 4 hours in order to convert dibasic acids into their anhydrides. This reaction mixture was then distilled under reduced pressure to remove acetic acid, water and unreacted acetic anhydride and the residue warmed and blown with nitrogen for further purification.

The infrared spectrum of samples of each of the anhydrides so prepared (runs 6, 7, 9 and 10) showed absorption bands indicative of the carbonyl grouping of succinic-type anhydrides, the absence of glutaric-type anhydrides and contamination of the samples with some non-cyclic anhydride. Table III, below, gives detailed hydrolysis data and test results on the recovered dibasic acids from runs 6, 7, 9, and 10.

The carbonylation product from run 5, above, was stripped of toluene by distillation. The bulk of the residue was dissolved in a liter of chloroform and separated by filtration from a waxy insoluble material. The waxy material was slurried with an additional 100 ml.

Table III

| Run Number | 6 | 7 | 9 | 10 |
|---|---|---|---|---|
| Hydrolysis reagent, grams | 560 | 559 | 560 | 560 |
| Conditions: | | | | |
| Temperature, ° F.— | | | | |
| min | 530 | 548 | 542 | 548 |
| max | 563 | 558 | 562 | 560 |
| ave | 552 | 552 | 552 | 553 |
| Nitrogen pressure, p.s.i.g.: | | | | |
| min | 1,220 | 1,260 | 1,280 | 1,630 |
| max | 1,610 | 1,350 | 1,620 | 1,910 |
| Duration, hours | 4 | 4 | 4 | 4 |
| Acid recovery, grams | 802 | 742 | 839 | 851 |
| Neut. No | 251 | 373 | 211 | 255 |
| Sap. No | 260 | 374 | 222 | 257 |
| Iodine No | 4 | 3 | 1 | 12 |
| Nitrogen content test | negative | | negative | negative |
| Weight percent dibasic acid in total recovered acid | 35.9 | 40.4 | 7.8 | 38.6 | of chloroform and filtered. Chloroform filtrate solutions were combined and treated with activated carbon at the boiling point of the resulting solution, filtered hot, and the chloroform stripped off by distillation. The stripped residue is dissolved in methanol at 150° C., the methanol solution cooled to 12° C., and a tan precipitate melting at 64–76° C. was separated therefrom. This tan precipitate was redissolved in methanol, refluxed with activated carbon for 30 minutes, filtered hot, crystallized, separated, and the operation repeated. 42 grams of a light tan solid melting at 81–83° C. was obtained. Nitrogen content of the so-purified solid was 3.59%. That this product was N-paratolyl pentadecyl succinimide is indicated by the following data: it had approximate molecular weight of 371; iodine number of 0; and it showed no infrared absorption peak at 3.0 microns (which would indicate amide rather than imide nitrogen linkage); calculated nitrogen analysis for N-paratolyl pentadecyl succinimide ($C_{26}H_{41}NO_2$) is 3.51%; molecular weight is 399; and iodine number is 0.

The carbonylation product from run 8, above, after filtering, was stripped of toluene solvent by distillation. The bulk of the stripped residue was dissolved in a liter of benzene and treated with bone charcoal at the boiling point of the solution for ½ hour. The solution was filtered hot to remove charcoal, and benzene was stripped from the filtrate by distillation. The stripped residue was dissolved in methanol with heating, chilled, and crystals melting at 31–50° C. were formed. The crystals were separated from methanol by filtration. Crystals were redissolved in hot methanol, treated with activated carbon, and carbon separated from the hot solution. The solution was then cooled and a crystal crop of 31 grams, having melting point of 33–38° C., was separated therefrom. 10 grams of the crystal crop were recrystallized from fresh methanol and 8.5 grams of nearly white crystals melting at 33–35° C. were recovered. That this crystalline material was N-normalhexyl pentadecyl succinimide is indicated by the following data: nitrogen analysis=3.59%; approximate molecular weight=405; and infrared spectrum showed no absorption peak at 3.0 microns (which would indicate amide rather than imide nitrogen linkage); calculated nitrogen analysis of N-normalhexyl pentadecyl succinimide ($C_{25}H_{47}NO_2$) is 3.56% and its molecular weight is 393.

Obviously many modifications and variations of the invention as hereinabove set forth may be made without departing from the spirit and scope thereof and therefore only such limitations should be imposed as are indicated in the appended claims. The embodiments of the invention in which an exclusive property or privilege is claimed are defined as follows.

We claim:

1. A process for the preparation of a succinyl compound comprising: reacting, at a temperature of 250°–600° F. and a pressure above 1000 p.s.i.g. in the presence of a carbonylation catalyst of the iron subgroup, a monocarboxylic acid containing at least 5 carbon atoms, said acid having an olefinic carbon-to-carbon bond displaced by an open chain of at least two methylene radicals from the carboxyl group, with carbon monoxide and an amine selected from the group consisting of primary and secondary alkyl, aryl, aralkyl, alicyclic and heterocyclic amines.

2. The process of claim 1 wherein said carboxylic acid is an acid of the oleic series having from 5 to 30 carbon atoms.

3. The process of claim 1 wherein the catalyst used contains cobalt, and the carbonylation is conducted at a temperature from 300° to 500° F. and a pressure from 3000 to 5000 p.s.i.g. using an inert hydrocarbon diluent.

4. The process of claim 1 wherein the succinyl compound is a succinimide and the amine is a primary amine.

5. The process of claim 1 wherein the succinyl compound is a succinamide and the amine used is a secondary amine.

6. The process of claim 1 wherein the carbonylation reaction product is subjected to hydrolysis conditions with water and hydrolysis catalyst at an elevated temperature, thereby forming a substituted succinic acid.

7. The process of claim 1 wherein the acid used is oleic.

8. The process of claim 1 wherein the acid used is undecylenic.

9. The process of claim 1 wherein the amine used is aniline.

10. The process of claim 1 wherein the amine used is a toluidine.

11. The process of claim 1 wherein the amine used is piperidine.

12. The process of claim 1 wherein the amine used is a hexylamine.

References Cited in the file of this patent

UNITED STATES PATENTS

| | | |
|---|---|---|
| 2,447,195 | Martin et al. | Aug. 17, 1948 |
| 2,542,766 | Gresham | Feb. 20, 1951 |
| 2,614,106 | Stoughton | Oct. 14, 1952 |
| 2,648,685 | Reppe et al. | Aug. 11, 1953 |
| 2,662,898 | Ross et al. | Dec. 15, 1953 |

FOREIGN PATENTS

| | | |
|---|---|---|
| 628,659 | Great Britain | Sept. 1, 1949 |